Oct. 11, 1927.
S. J. ELLIS
1,644,878
COOKER SWEEP
Filed May 10, 1922  2 Sheets-Sheet 1
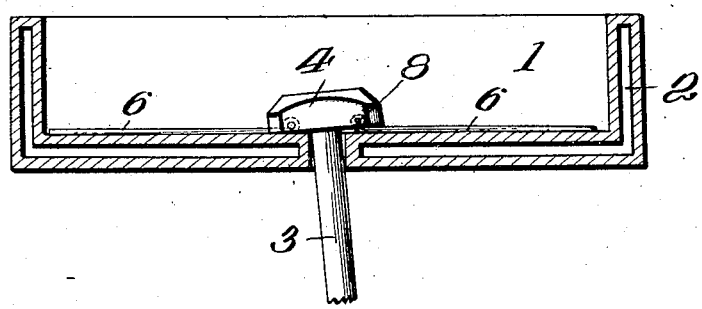
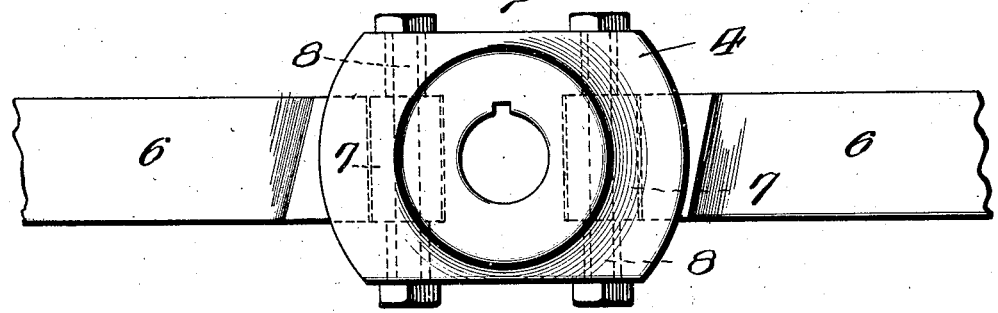
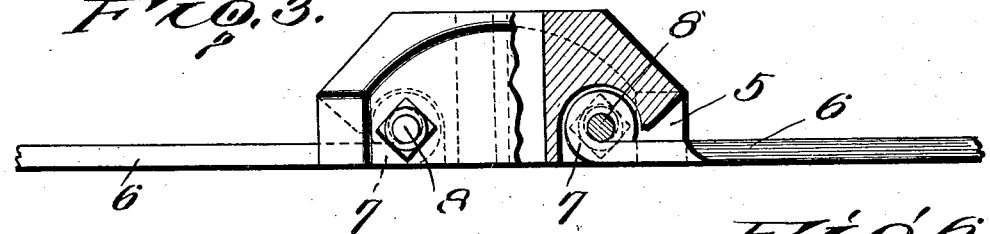
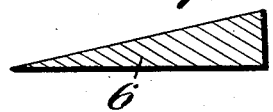
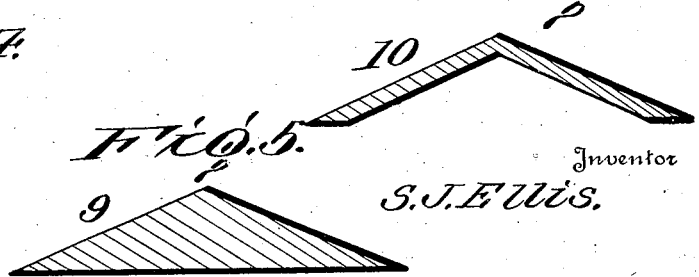
Inventor
S. J. ELLIS.
By
Attorney Oct. 11, 1927.
S. J. ELLIS
1,644,878
COOKER SWEEP
Filed May 10, 1922
2 Sheets-Sheet 2
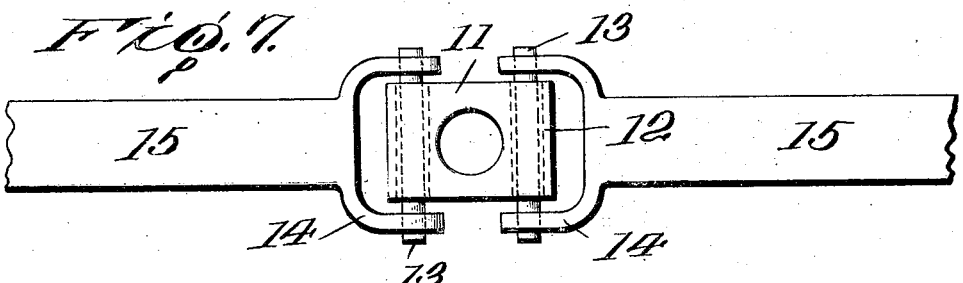
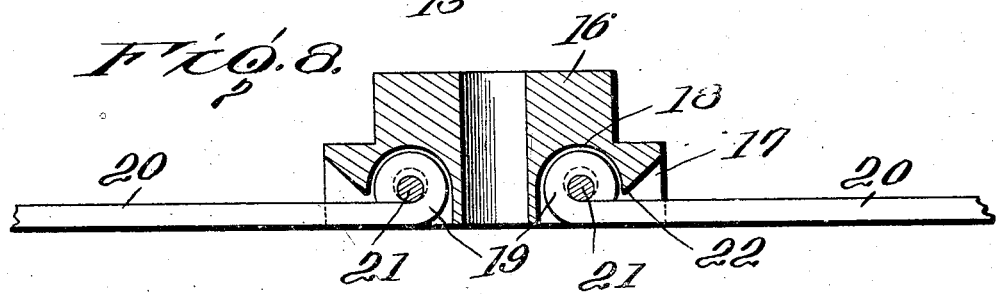
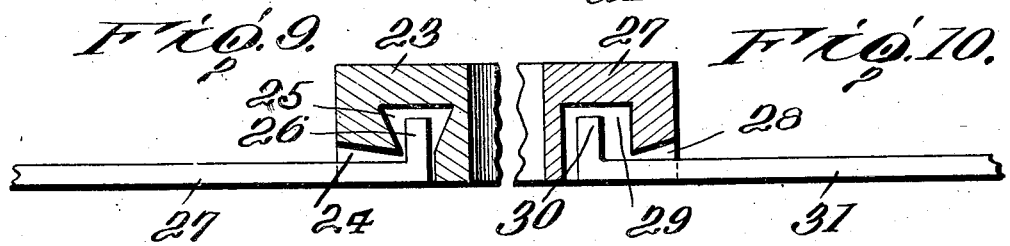
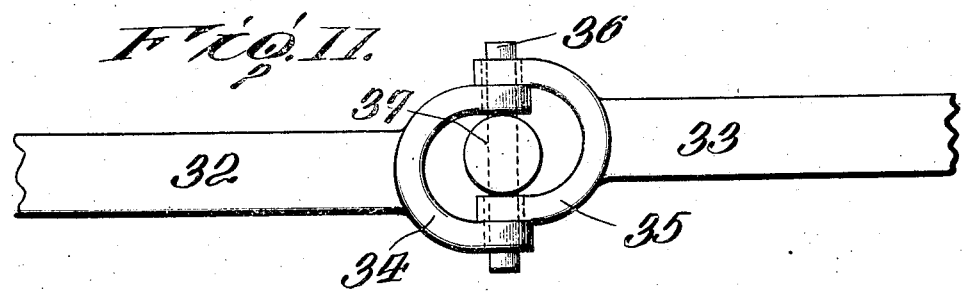
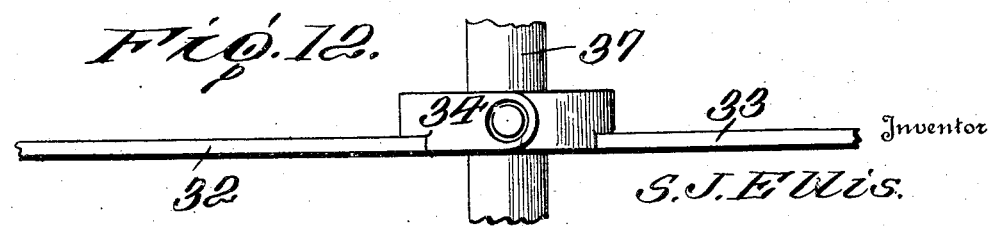
Inventor
S. J. Ellis.

Patented Oct. 11, 1927.

1,644,878

UNITED STATES PATENT OFFICE.

SAMUEL J. ELLIS, OF MEMPHIS, TENNESSEE.

COOKER SWEEP.

Application filed May 10, 1922. Serial No. 559,920.

This invention relates to certain new and useful improvements in cooker sweeps especially adapted to be used in connection with cookers employed for cooking seed meal preparatory to expressing the oil therefrom, the object being to provide a construction of cooker with a sweep so mounted that it is free to move vertically as well as to swing on its pivot so that the blade of the sweep will follow the contour of the bottom of the kettle so as to prevent the meal from burning or over-cooking.

Another and further object of the invention is to provide a cooker sweep which is exceedingly simple and cheap in construction and one which can be readily attached to the drive shaft of the cooker and operated with less horse power than is required to operate sweeps of this kind now in use.

A still further object of the invention is to provide a sweep which will adjust itself to the bottom of the kettle even if the drive shaft is out of alignment.

Other and further objects and advantages of the invention will be hereinafter set forth and the novel features thereof defined by the appended claim.

In the drawings,

Figure 1 is a vertical section through a kettle showing the shaft out of line with my improved construction of sweep attached thereto;

Figure 2 is a top plan view of the sweep detached;

Figure 3 is an elevation partly in section;

Figure 4 is a section through one form of sweep arm or stirrer;

Figure 5 is a section through another form of sweep arm or stirrer;

Figure 6 is still another form of sweep arm or stirrer;

Figure 7 is a slightly modified form of mounting the sweep arm or stirrer on the hub;

Figure 8 is a section through still another modified form;

Figure 9 is a detail section showing the arm or stirrer loosely mounted within the hub;

Figure 10 is a similar view of another form showing the arm or stirrer mounted for vertical or radial movement;

Figure 11 is a top plan view of a modified form of sweep showing the same attached directly to the shaft; and Figure 12 is an elevation of the same.

In the drawing 1 indicates a kettle provided with a chamber 2 for the introduction of steam for cooking the meal placed therein and in the present form of cooker as now in use, these kettles are preferably arranged in series and the shaft extends through the kettles but in illustrating my invention, I have only shown one kettle, and, of course, I do not wish to limit myself to the use of my improved construction of cooker sweep to any particular construction of kettle.

In Figure 1 I have shown a shaft 3 extending through a bearing formed in the bottom of the kettle, said shaft being shown out of line in order to clearly illustrate the advantage of my improved construction of cooker sweep when attached to such a shaft.

In the construction shown in Figures 1, 2 and 3, I secure to the shaft 3 a hub 4 which is bifurcated as shown at 5 and as herein shown, these bifurcations are oppositely disposed so as to accommodate the two stirrer arms or blades, but it is, of course, understood that any number can be used.

Arranged within the bifurcations 5 are blades 6 which are provided with eyes or bearings 7 through which extend bolts 8 for securing the blades in position within the bifurcations and the construction of blade is such that it fits snugly within the bifurcations so that the driving power is exerted by the side walls of the bifurcations rather than the pivot bolt 8.

The bolts 8 have a diameter less than the bearing 7 of the blades so that the blade can move vertically on the pivot 8 as well as to swing around the pivot as an axis in order to allow the blades to adjust themselves to the contour of the kettle and in Figure 1 I have shown the blades arranged in close contact with the bottom of the kettle when the shaft is out of line so that all of the meal within the kettle will be acted on by the blade in order to prevent the meal from being scorched or burnt or over-cooked.

The blade 6 is provided with a beveled face as shown in Figure 4 but as shown in Figures 5 and 6, a blade 9 can be used having two beveled faces in order to allow the same to be rotated in either direction.

In Figure 6 the blade 10 is shown formed with its under-surface cut away while in Figure 9, the blade is formed solid and these forms of blades are illustrated to show that other forms of blades can be used in connection with the particular manner of mounting the same without departing from the spirit of my invention.

In the form shown in Figure 7, the sweep is composed of a hub 11 having bores 12 in which are arranged pins 13 on which are mounted the apertured forked arms 14 and blades 15 and in constructing this form of sweep, the pins are also formed of a less diameter than the apertures in the forked arms so that the blades can move up and down thereon.

In the form shown in Figure 8, the sweep is composed of a hub 16 bifurcated as shown at 17, which bifurcations are enlarged as shown at 18 in which are mounted the bearings 19 of blades 20 on pivots 21, the construction of the bifurcations being such that the upward movement of the blade is limited by shoulder 22 formed by the bifurcation and chamber.

In Figure 9 I show a hub 23 bifurcated at 24 having a chamber 25 into which extends the upwardly extending portion 26 of a blade 27, said blade being arranged within the bifurcation and chamber and held therein by a contact with the bottom of the kettle and in this construction the blade is free to move up and down and is rotated with the hub without having a positive connection with the hub, as in the preferred form through the medium of the bearing pin.

In Figure 10 I show a hub 27 bifurcated at 28 having a chamber 29 into which extends the upwardly extending portion 30 of a blade 31 and it will be seen by this construction that the chamber is of such a size that the blade is free to move vertically and radially so that the end of the blade will extend to the wall of the kettle so as to scrape the meal therefrom.

In Figures 11 and 12, I show a cooker sweep composed of a pair of blades 32 and 33 provided with forked ends 34 and 35 having apertures which are mounted directly on a pin 36 extending transversely through a shaft 37 and in this form the pin has a diameter less than the diameter of the openings of the forked arms so as to allow the arms to move vertically as well as to swing on the pin.

From the foregoing description it will be seen that I have provided a cooker sweep in which a number of blades or stirrers are so mounted that they are capable of moving vertically in order to allow the blades to adjust themselves to the bottom of the kettle irrespective of the position of the shaft. It will also be seen that these blades in their rotation follow the contour of the kettle so as to scrape the meal from the bottom of the kettle to prevent the same from being scorched.

What I claim is:—

In a cooker sweep mechanism, a receptacle, a central body member rotative therein, sweep arms each having a loose connection therewith providing free vertical movement of said arms at the point of connection with the body member, said arms having lower scraping surfaces operative to freely rest upon and scrape the bottom of said receptacle immediately below the point of connection with the body member and outwardly thereof when said body and arms are rotated.

In testimony whereof I hereunto affix my signature.

SAMUEL J. ELLIS.